United States Patent [19]

Spencer

[11] 4,357,609
[45] Nov. 2, 1982

[54] NONCOHERENT TWO WAY RANGING APPARATUS

[75] Inventor: Billie M. Spencer, Bountiful, Utah

[73] Assignee: Sperry Corporation, New York, N.Y.

[21] Appl. No.: 180,737

[22] Filed: Aug. 25, 1980

[51] Int. Cl.³ .............................................. G01S 13/08
[52] U.S. Cl. ................................ 343/12 R; 343/5 PN
[58] Field of Search ........................... 343/5 PN, 12 R

[56] References Cited

U.S. PATENT DOCUMENTS

| 3,183,506 | 5/1965 | Webb | 343/12 R X |
| 3,223,998 | 12/1965 | Hose | 343/12 R |
| 3,412,399 | 11/1968 | Chisholm | 343/12 R X |
| 3,566,268 | 2/1971 | Webb | 343/5 PN X |
| 3,725,920 | 4/1973 | Kupfer et al. | 343/12 R X |
| 3,900,873 | 8/1975 | Bouvier et al. | 343/12 R |

OTHER PUBLICATIONS

"Pseudorandom Code Waveform Design for CW Radar" by Albanese et al., IEEE Transactions on Aerospace and Electronic Systems, vol. AES-15, No. 1, Jan. 1979, pp. 67-75.

Primary Examiner—Malcolm F. Hubler
Attorney, Agent, or Firm—John B. Sowell; Kenneth T. Grace; Marshall M. Truex

[57] ABSTRACT

An accurate radio frequency ranging system is provided for measuring the time of transmission of a signal from a first station to a second station and back to the first station without coherent turn-around of the signal. Each of the two stations is provided with its own range measuring means and its own reference clock. The first station range measuring device is started by the first station reference marker and is stopped by the second station reference marker start signal transmitted from the second station to provide a first range measurement. The second station range measuring device is started by the second station reference marker and is stopped by the reference marker start signal transmitted from the first station to provide a second range measurement. The sum of the two range measurements contains the data necessary to calculate the true range between stations and the difference between the two range measurements contains the data necessary to calculate the offset between the two reference clocks without the two reference clocks being synchronized or locked to each other.

10 Claims, 4 Drawing Figures

NONCOHERENT TWO WAY RANGING APPARATUS

BACKGROUND OF THE INVENTION

1. Field of the Invention

This invention relates to radio frequency ranging apparatus. More specifically, the apparatus relates to measurement of the two way range between a ground station and a remote (airborne) station and the simultaneous measurement of offset of the station clocks.

2. Description of the Prior Art

Two way radio frequency ranging systems are not new and such systems have been described in Jet Propulsion Laboratory Technical Report 32-1475 published July, 1970.

This article explains that ranging systems are conveniently assigned into classifications depending on their method of coding. One such method involves utilization of a pseudonoise code of sufficient period to resolve range ambiguities and a bit length short enough to provide the required resolution. The most desirable selection of a pseudonoise code requires long acquisition times. Several methods are suggested which would reduce acquisition time even though the complexity of the hardware implementation would be increased. A multicomponent combinatorial unit has been suggested employing component sharing at the cost of power transmission loss. The loss of power can be overcome by employing sequentially transmitting components; however, sequential use of components increases hardware cost and increases the time required for transmission.

The use of pseudonoise spread spectrum codes in data links permit weak spectral signals to be transmitted and decoded accurately after being received at a remote station. The use of continuous bandwidth pseudonoise spread spectrum codes permits processing gain enhancement at the receiver. It is important that the data link code cannot be decoded or jammed and the longer the binary sequence the more difficult it is for others to intercept and decode the sequence.

As the binary sequence is increased the acquisition time also increases. If some outage or interruption occurs between data links reacquisition must be established, which under hostile or unfavorable conditions, could be more difficult that original acquisition under favorable non-hostile conditions.

Transmission of information employing pseudonoise spread spectrum codes, whether continuous or discontinuous is dependant on having a replica of the sequence being transmitted available at the receiving station to be employed to demodulate the incoming waveform. Acquisition or reacquisition of the transmitted waveform requires that a replica of the transmitted sequence be locked on or synchronized in phase with the incoming sequence waveform.

When the ground station is receiving information from the remote station, it too must be provided with means for producing a replica of the transmitted sequence to be employed to demodulate the incoming waveform being transmitted from the remote station.

Heretofore, two way ranging has been performed through coherent turn-around of a marker signal. In coherent turn-around the demodulating replica at the remote station must be synchronized and in phase with the received waveform. The received marker signal is processed (i.e., turn-around) and re-transmitted back to the ground station where it is demodulated employing a replica sequence of the code. This replica sequence must also be locked on the transmitted waveform from the remote station. When coherent turn-around is required for ranging measurements. The remote station must acquire and lock on the original signal. After the remote station has acquired the ground station signal it may then transmit the processed signal back to the ground station, which must also acquire the retransmitted signal. Coherent turn-around requires that both stations be locked on to the waveform being transmitted from the other station.

It is known that range measurement between stations can be calculated by measuring the time an electro-magnetic signal takes to travel from a ground station to a remote station and return to the ground station. A complete knowledge of the delays encountered by the transmitted signal must be either known or can be accurately estimated.

It would be extremely desirable to provide a ranging system which is secure and not easily jammed. Further, it would be desirable to provide a ranging system which could use the structural elements of the data link already present at the stations and would operate in a manner which reduces acquisition time.

It would be extremely desirable to be able to measure the clock offset between clocks in different stations.

SUMMARY OF THE INVENTION

It is a principal object of the present invention to provide an improved non-coherent ranging system.

It is a primary object of the present invention to provide a method of accurately measuring the clock offset between two remotely located reference clocks.

It is another object of the present invention to provide a method and means for measuring the clock offset between a master reference station and any number of remote station clocks.

It is another primary object of the present invention to provide a ranging system embodying a ground ranging device and an airborne ranging device having reference clocks which are independant of each other.

It is another object of the present invention to reduce the acquisition time for a ranging system used in combination with spread spectrum codes.

It is an object of the present invention to provide a non-coherent ranging system employing spread spectrum code technology which reduces average acquisition time by at least one half of that required in a coherent system.

According to these and other objects of the present invention, there are provided two stations remote from each other. Each station is provided with a range measuring device and a reference clock. The reference marker in the first station is employed to start the range measurement at the first station. The same signal which starts the first station range measurement is transmitted to the second station as a coded signal. The received signal is decoded at the second station and the start signal, now delayed, which started the first station range measurement, is employed to stop the second station range measurement which was started by the reference marker in the second station. The signal which starts the second station range measurement is transmitted back to the first station where it is received, decoded and employed to generate a delayed start signal used to stop the range measurement at the first station. The two range measurements contain sufficient data to calculate the true range even though the two reference clocks are not synchronized.

DESCRIPTION OF THE PREFERRED EMBODIMENT

Figure 1:
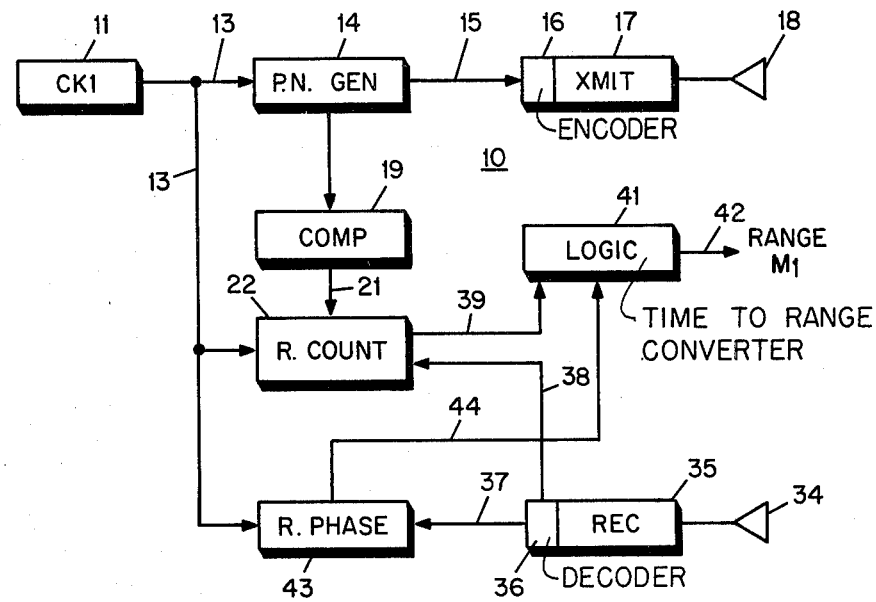
FIG. 1 is a block diagram showing the elements of a range measuring system employed in a first station or ground station.
Figure 2:
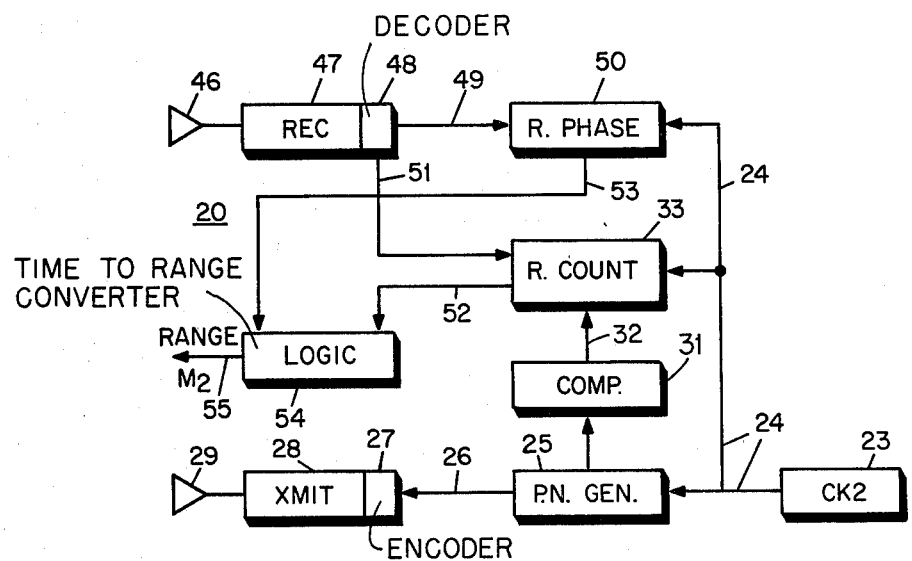
FIG. 2 is a block diagram showing the element of a range measuring system employed in a second station or airborne station.

Refer now to FIGS. 1 and 2 showing in block diagram the structure employed in a ground station and a remote airborne station to transmit and receive signals.

Reference clock 11 in ground station 10 generates a stable repetitious signal such as that provided by a stabilized oscillator or wave generator. The processed output signals on output line 13 are applied to pseudonoise (PN) generator 14. Generator 14 is preferably a linear feedback type shift register driven by a square wave or sine wave clock signal. The output of PN generator 14 on line 15 is applied to modulation-encoder 16 and transmitter 17 to produce a coded sequence of signals on antenna 18.

The pseudonoise generated code comprises a balance of ones and zeros preferably generated in a random sequence that has no identifiable data contained in the code. The transmission rate is not critical but needs to be sufficient to meet the fine range resolution requirements and may be hundreds of mega bits per second. Accordingly, even though a large number of bits may be employed to define a code sequence, the rate of word transmission is high enough to transmit information rapidly.

As an example, if the shift register employed for generating the code is seven cells or bits long, there may be $(2)^7$ or 128 possible unique binary words seven bits long. If the combination of all zeros is eliminated, there are 127 possible combinations and these combinations can be produced by a PN generator. Words of greater number of bits may be employed, which will increase the sequence length, increase the security of the code but also increases the acquisition time.

The PN generator 14 repeats the same sequence of 127 words in the same order, so it is possible to detect a predetermined word combination of seven bits with a comparator or equivalent device. When a desired predetermined epoch or marker word is detected in comparator 19, a start or epoch marker is generated on line 21 which is applied to range counter 22 to start the range measurement M1 at station 10 by counting clock 11 pulses.

The uplink or airborne station 20 preferably has a duplicate set of equipment to station 10 so that equipment-delays will be substantially equal. Reference clock 23 in station 20 is preferably operating in very close synchronism with reference clock 11 in station 10; however, there is no requirement that they be synchronized as in coherent turn-around systems.

Clock 23 signals on line 24 are applied to PN generator 25 to produce a pseudonoise code output on line 26. The coded output is applied to modulator-encoder 27 and then to transmitter 28 to produce a coded sequence of signals on antenna 29. The up range or remote PN generator also produces the same sequence of 127 words in the same order as PN generator 14. When the same desired predetermined epoch or marker word is detected at comparator 31, a start or epoch marker is generated on line 32 to start the range measurement M2 at station 20 by counting clock 23 pulses. As will be explained hereinafter, it is not necessary that the counters 22 and 23 be started simultaneously to effect proper range measurements.

The signal transmitted from airborne station 20's transmitting antenna 29 is received at ground station 10's receiving antenna 34. The received modulated coded signal is processed in receiver 35 and is decoded in decoder 36, which includes a tracking generator. The purpose of the tracking generator is to synchronize a replica of the pseudonoise code with the incoming coded signal. In the preferred embodiment, the tracking generator is locked onto the incoming signals and stays locked onto the signal to produce a tracking clock signal on line 37 synchronized with the transmitted clock signals and an epoch or marker word. It will be understood that the epoch marker signal generated on line 38 is only generated after the predetermined word used to generate the start signal on line 32 at station 20 has been transmitted from station 20 back to station 10 and, when generated as an epoch signal at station 10, is in effect a delayed start signal or replica of the epoch marker signal employed to start range counter 33.

The epoch marker signal on line 38 is applied to range counter 22 to stop the counter 22. The total time lapsed between the starting and stopping of counter 22 is applied via line 39 to logic 41 for purposes of calculating the range M1, shown as an output at line 42. The tracking clock signal on line 37 may be applied to range phase detector 43 to determine the phase difference, or part of a count between a reference clock 11 signal on line 13 and the replica or received tracking clock signal shall derived from reference clock 23. The phase difference is applied to logic 41 via line 44 to enhance or refine the range measurement M1.

Logic 41 may be a program or routine stored in the data processing unit (not shown) found in the stations. In order to make the two way range calculation discussed herein, the range information from the remote station must be transmitted to the ground station.

The M2 range measurement is made in a manner similar to the M1 measurement. Range counter 33 was started by the detection of a predetermined epoch marker signal on line 32 and is synchronized with reference clock 23 in station 20. Antenna 46 in airborne station 20 is receiving the transmitted coded signal from transmitting antenna 18 in station 10. The received modulated coded signal is processed in receiver 47 and is decoded in decoder 48, which includes a tracking generator having a replica of the pseudonoise code synchronized with the incoming coded signal. A clock signal synchronized with reference clock 11 is produced on line 49 and detection of the received epoch marker is produced on line 51 and applied to range counter 33 to stop the count. It will be understood that the epoch marker signal on line 51 is a delayed detection of the predetermined epoch marker signal, which produces the start signal on line 21 at station 10.

Phase detector 52 compares the phase of clock 23's signal on line 24 with the tracking clock signal on line 49 to produce a phase difference, or part of a count, between a reference clock 23 signal and the received clock signal on line 51. Both the range count on line 52 from counter 33 and the phase difference on line 53 from detector 52 are applied to logic 54 to produce an accurate range measurement M2 on line 55. As explained hereinbefore, logic 54 may be a program stored in part of the data processing unit in station 20.

Figure 3:
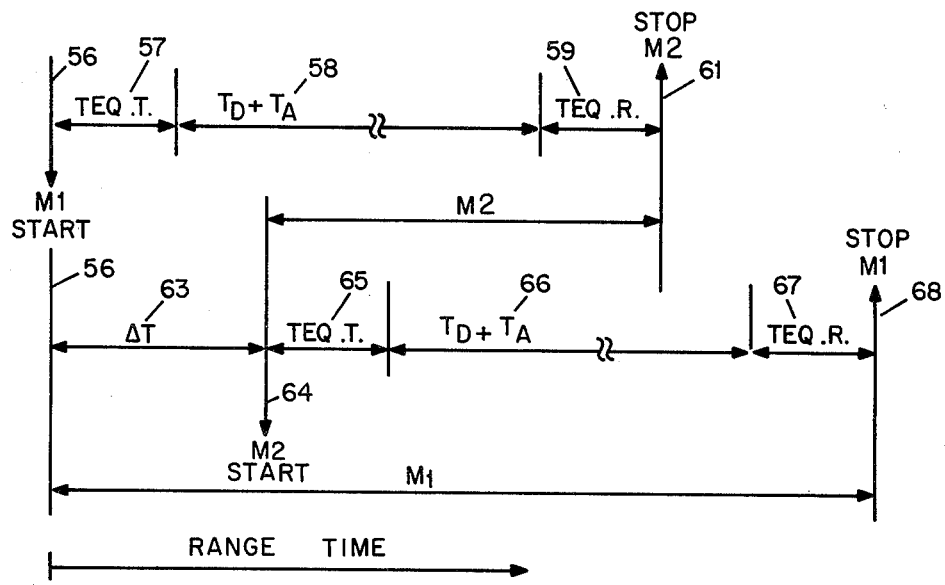
FIG. 3 is a timing diagram showing typical start and stop times for the range measuring systems of FIGS. 1 and 2 when the reference clocks are not synchronized.

Refer now to FIG. 3 which shows in chart form the sequence of real time events occurring at stations 10 and 20. Assume that reference clock 11 is slightly advanced or ahead of reference clock 23 in station 20. The start signal on line 21 is shown at point 56 denoted as M1 start. The signal immediately starts range counter 22 and the same epoch marker coded word is delayed in line 15, modulation-encoder 16 and transmitter 17, etc. These delays are denoted as equipment delays of the transmitting station ($T_{EQ}.T.$) at point 57.

The coded epoch marker is transmitted from station 10 to station 20 as an electromagnetic signal and incurs delays due to distance as well as atmospheric anomalies. The true distance or range delay and atmospheric delay is denoted as $T_D+T_A$ at point 58.

The received signal at station 20 is received at antenna 46 and again is delayed by lines and equipment denoted as $T_{EQ}.R.$ at point 59. The received epoch marker is employed to produce the stop M2 signal on line 51 shown at point 61.

Reference clock 23 was assumed to be behind reference clock 11 and the clock offset or difference is shown at point 62 as $\Delta T$.

The start signal on line 32 is produced when the same predetermined epoch marker is detected at station 20 by comparator 19. Since reference clocks 11 and 23 are not synchronized or locked to each other in real time or in coherent turn-around-time the clock offset $\Delta T$ may vary from time to time. This start signal on line 32 is shown at point 64 denoted as M2 start. The coded epoch marker is delayed in modulation-encoder 27 and transmitter 28 as well as the connecting line causing equipment delays denoted as $T_{EQ}.T.$ at point 65. The coded signal is transmitted from station 20 back to station 10 and incurs delays due to distance as well as atmospheric anomalies. The true range delay and atmospheric delay is denoted as $T_D+T_A$ at point 66.

The received signal at station 10 is received at antenna 46 and incurs equipment and line delays denoted as $T_{EQ}.R.$ at point 67 before the coded epoch marker is detected at station 10 and employed to produce the stop M1 signal on line 38 shown at point 68.

As best shown in the chart of FIG. 3, the range measurement $M1 = \Delta T + T_D + T_A +$ equipment delays 65 and 67 incurred at stations 20 and 10. Also $M2 = -\Delta T + T_D + T_A +$ equipment delays 57 and 59 incurred at stations 10 and 20. When M1 and M2 are added together the result is twice the true range $T_D$ and atmospheric anomalies plus all equipment delays. It is well known that the equipment delays can be measured accurately either on the ground or by special means after being made airborne. Thus, $M1+M2=2(T_D+T_A)+K$ where K represents known equipment delays and $T_A$ represents atmospheric anomalies that can be estimated accurately, especially when the ranges M1 and M2 are made substantially simultaneously.

It will be noted that the difference $M1-M2$ is equal to $2\Delta T$ when $T_A$ and the equipment delays cancel out. Accordingly, it is preferred that the aforementioned equipment delays $T_{EQ}.R.$ and $T_{EQ}.T.$ be as close to the same as possible at station 10 and station 20. Even when the equipment delays are not the same, they are known within the required accuracy for range and clock offset calculations.

The true clock offset $\Delta T$ may be employed to determine the true clock offset between two or more remote stations relative to a ground station. Thus, the offset between reference clocks in remote stations can be calculated.

It will be noted that when coherent turn-around of a ranging signal was employed heretofore, the clock signal at the remote station merely tracked or locked on the received signal from the ground station and was affected by range, equipment delays and atmospheric anomalies. It is now possible to synchronize the reference clock in any number of remote stations or vehicles before they leave the ground. The reference clocks can remain as independant, highly accurate reference clocks and any deviation from true synchronization can be measured and corrected if such is required. Means for correcting clock synchronization are well known and do not require further explanation.

It will be observed from an analysis of FIG. 3 that M1 is greater than M2 because of clock offset $\Delta T$. Had the reference clocks 11 and 23 been in true synchronization, M1 and M2 would have been started simultaneously and if the equipment delay in stations 10 and 20 were equal, the range measurements M1 and M2 would have concluded simultaneously. Thus, it will be observed that the tracking generators at stations 10 and 20 can be locking onto the received signals simultaneously and little or no deviation would be expected during reacquisition or original acquisition assuming the reference clocks 11 and 23 are not lost.

The distance M1 is shown in FIG. 3 to be longer than the one way range time. To prevent duplication of start and stop signals during a ranging operation, the selected predetermined epoch marker should not occur more frequently than the average turn-around-time. As long as the reference clocks 11 and 23 are reasonably close in time and the epoch markers are separated in time by the two way range time, there will be no redundancy because the ranging measurements will always be made in less time than is required for the usual two way coherent turn-around method. Even if the true range becomes greater than the distance between epoch marker pulses, range measurements can still be made by adding the base time between epoch marker pulses to the appropriate M1 and M2 measurements.

Figure 4:
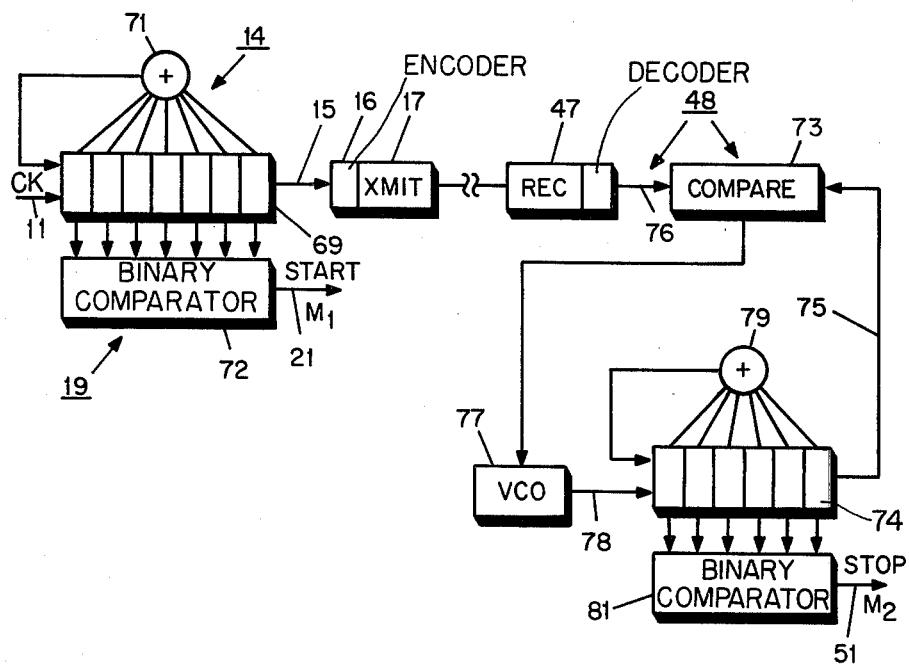
FIG. 4 is a more detailed block diagram of a typical system which may be employed to generate start and stop signals.

Refer now to FIG. 4 showing in greater detail the pseudonoise generator 14 and transmitter 17 of FIG. 1. The generator 14 may comprise a linear shift register 69 having seven stages or cells. The state or output of each cell is summed together in a modulo two combiner 71. The output sum is recirculated back to the input stage of the shift register to continually reset the first stage. The whole shift register is shifted by the clock 11 via line 13 as shown in FIG. 1. The state or output of shift register 69 is also applied to a comparator 19 which may comprise a logic combiner 72 or other type of binary comparator. When the shift register 69 produces the desired predetermined epoch marker sequence, a start M1 signal may be produced, which is applied to range counter 22. In the preferred embodiment, the start or range count enable signal is a sharp distinct pulse no more than two bit times wide at the base. The signal may be processed before use.

The pseudonoise code being generated on line 15 is modulated in modulator encoder 16 and transmitted to station 20 by transmitter 17. Receiver 47 at station 20 receives and demodulates the signals at receiver demodulator 47, 48. The transmitted signal is compared with the output of pseudonoise generator shift register 74 in comparator 73. When the replica signal on line 75 is the same as the reproduced transmitted signal on line 76, the voltage controlled oscillator 77 is tracking and is in synchronism with the incoming signal. The voltage controlled oscillator clock signal on line 78 maintains the pseudonoise coded output on line 75 in synchronism with the incoming signal. The output of the linear shift register 74 is applied to a modulo two combiner 79 and recirculated to the input stage of the shift register 74. The output of the shift register 74 is also applied to a logic combiner 81 or other type binary comparator and when the output matches or coincides with the predetermined sequence epoch marker, a stop signal is generated on line 51 which is employed to stop range counter 33.

While FIG. 4 only shows the generation of the start M1 signal and the stop M2 signal, the structure for generating the start M2 signal and stop M1 signal is identical. Range counter 33 was started by the start M2 signal on line 32, and comparator 31 may be similar to logic combiner 71. Range counter 22 was stopped by stop M1 signal on line 38, and decoder-tracking generator 36 may be similar to comparator 73, generator 74 and logic combiner 81.

Having explained the novel combination of structure employed to make two one way range measurements M1 and M2, it will be understood that the range measurements also include the data necessary to calculate the offset of the two reference clocks. The two range measurements M1 and M2 can be made during the same real time interval and are not dependant on coherent turn-around where the retransmitted signal is synchronized in sequence and phase. Accordingly, under hostile and severe jamming conditions, acquisition and reacquisition is made faster and more accurately.

Most of the structure employed in the present invention is already present in the ground and airborne stations using coherent turn-around. If the remote stations are supplied with reference clocks used for ranging, these clocks can be used for other purposes but do not require that they be synchronized with the ground station clock. When two stations are employing continuous pseudonoise generated codes, it is only necessary to select a predetermined one of the sequence of words to generate epoch markers used for ranging and the measurement of clock offset.

Various modification to the structure for generating start and stop signals for the range measurements M1 and M2 can be made. For example, simplification of the detection of a sequence denoting the epoch marker could be accomplished. If there was no requirement for employing secure type spread spectrum codes, the pseudonoise generating and replica tracking generators could be replaced with simple timing devices. It is apparent that any predetermined timed signals may be employed to start and stop the M1 and M2 measurements.

Other modifications will suggest themselves to those skilled in this art now that the concepts of the invention are made clear.

I claim:

1. Apparatus for determining the range between a first station and a second station by measuring the time required for radio frequency signals to be transmitted between the stations, the combination comprising:
   a first station pseudonoise generator 14 for generating a plurality of unique coded signals,
   a first station reference clock 11 for driving said first station pseudonoise generator,
   first station means for detecting 19 a predetermined one of said unique coded signals and for generating a first station epoch marker signal,
   a first ranging system 21 started by said first station epoch marker signal,
   first station transmitter means 17, 18 coupled to said first station pseudonoise generator for transmitting the output of said first station pseudonoise generator to said second station,
   second station receiver means 46, 47 for receiving said first station transmitted signals,
   second station means for detecting 48 said unique coded signals transmitted from said first station and for generating a delayed first station epoch marker signal,
   a second station pseudonoise generator 25 for generating the same plurality of unique coded signals as said first pseudonoise generator,
   a second station reference clock 23 for driving said second station pseudonoise generator,
   second station means for detecting 31 the predetermined one unique coded signal of said plurality of said unique coded signals and for generating a second station epoch marker signal, a second station ranging system 33 started by said second station epoch marker signal,
   second station transmitter means 28, 29 coupled to said second station pseudonoise generator for transmitting said second station unique coded signals to said first station,
   first station receiver means 34 for receiving said second station unique coded signals,
   first station means for detecting 36 said predetermined one of said unique coded signals transmitted from said second station and for generating a delayed second station epoch marker signal,
   said first station ranging system being stopped by said delayed second station epoch marker signal, and
   said second station ranging system being stopped by said delayed first station epoch marker, whereby the sum of the ranges detected at said first station ranging system and said second station ranging system is equal to the turn-around range between said first station and said second station plus known delays, and the difference of the ranges detected is equal to twice the offset of the reference clocks.

2. Apparatus as set forth in claim 1 wherein first station receiving means and said second station receiving means each comprise a tracking generator for decoding said unique coded signals and generating a synchronized output clock signal.

3. Apparatus as set forth in claim 2 wherein said first station receiving means and said second station receiving means each comprise a pseudonoise generator for decoding said unique coded signals and generating the delayed epoch marker signals.

4. Apparatus as set forth in claim 2 wherein said first ranging system further includes a first range phase detector connected to the synchronized output clock of the first station receiver and to said first station reference clock.

5. Apparatus as set forth in claim 2 wherein said second ranging system further includes a second phase detector connected to the synchronized output clock of the second station reference clock.

6. The method of measuring the distance between two remote stations to eliminate coherent turn-around, each said station having its own reference clock, pseudonoise generator, epoch marker detector, range measuring system, transmitter and receiver; comprising the steps of:

employing the first station reference clock to synchronize the first station pseudonoise generator, employing the second station reference clock to synchronize the second station pseudonoise generator, detecting a predetermined epoch marker in the output of said first pseudonoise generator, detecting a predetermined epoch marker in the output of said second pseudonoise generator, starting the first station range measurement with a signal denoting the detection of said epoch marker at the output of said first pseudonoise generator, starting the second station range measurement with a signal denoting the detection of said epoch marker at the output of said second pseudonoise generator, transmitting the output of said first pseudonoise generator to said second station, transmitting the output of said second pseudonoise generator to said first station, receiving and decoding said transmitted output of said first pseudonoise generator at said second station to provide a delayed detection of the predetermined epoch marker in the output of said first pseudonoise generator, receiving and decoding said transmitted output of said second pseudonoise generator at said first station to provide a delayed detection of the predetermined epoch marker in the output of said second pseudonoise generator, stopping the first station range measurement with a signal denoting the delayed detection of the predetermined epoch marker at the output of the receiver-decoder at said first station to provide a first station range measurement, stopping the second station range measurement with a signal denoting the delayed detection of the predetermined epoch marker at the output of the receiver-decoder at said second station to provide a second station range measurement, and calculating the one way range between said two stations as being proportional to the range measurements minus the known delays.

7. The method as set forth in claim 6 wherein the first station range measurement is equal to $M-1$ and the second station range measurement is equal to $M-2$ which further includes the step of calculating the two-way range measurement between stations as being equal to the sum of $M-1$ plus $M-2$ minus twice the known delays in the equipment and atmospheric anomalies.

8. The method as set forth in claim 6 which further includes the step of calculating twice the offset of the reference clocks as being equal to the difference between the range measurements, $M-1$ minus $M-2$.

9. The method as set forth in claim 7 which further includes the steps of measuring the delays in the equipment and estimating the delays due to atmospheric anomilies.

10. The method as set forth in claim 8 which included the steps of measuring the offset of the reference clocks between a first master ground station and a second airborne station then measuring the offset of the reference clocks between the first master ground station and a different airborne station and calculating the offset of the reference clocks between the two airborne stations.

* * * * *